United States Patent
Panteleev

(10) Patent No.: US 11,763,520 B2
(45) Date of Patent: *Sep. 19, 2023

(54) IMPROVING AREA LIGHT SHADOWS IN COMPUTER GENERATED SCENES

(71) Applicant: Nvidia Corporation, Santa Clara, CA (US)

(72) Inventor: Alexey Panteleev, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,780

(22) Filed: Apr. 12, 2022

(65) Prior Publication Data

US 2022/0237861 A1    Jul. 28, 2022

Related U.S. Application Data

(63) Continuation of application No. 17/145,008, filed on Jan. 8, 2021, now Pat. No. 11,302,068, which is a
(Continued)

(51) Int. Cl.
*G06T 15/60* (2006.01)
*G06T 15/06* (2011.01)
(Continued)

(52) U.S. Cl.
CPC .............. *G06T 15/60* (2013.01); *G06T 15/06* (2013.01); *G06T 15/80* (2013.01); *G06T 19/20* (2013.01);
(Continued)

(58) Field of Classification Search
CPC ....... G06T 15/005; G06T 15/60; G06T 15/06; G06T 15/80; G06T 19/20; G06T 2215/12; G06T 1/20
See application file for complete search history.

(56) References Cited

U.S. PATENT DOCUMENTS

| 2008/0074421 A1 | 3/2008 | Hayes |
| 2013/0328875 A1 | 12/2013 | Burley et al. |
| 2014/0376606 A1 | 12/2014 | Meier et al. |

FOREIGN PATENT DOCUMENTS

WO    2019183149 A1    9/2019

OTHER PUBLICATIONS

Urena, et al.; "An Area-Preserving Parametrization for Spherical Rectangles"; Eurographics Symposium on Rendering 2013; Nicholas Holzschuch and Szymon Rusinkiewicz (Guest Editors); vol. 32 (2013), No. 4; 2013; 8 pgs.
Heitz, et al.; "Real-Time Polygonal-Light Shading with Linearly Transformed Cosines"; Research Page; https://eheitzresearch.wordpress.com/415-2; 2016; 6 pgs.
Assarsson, et al.; "A Geometry-based soft Shadow Volume Algorithm using Graphics Hardware"; Chalmers Univeristy of Technology Sweden; http://citeseerx.ist.psu.edu/viewdoc/download?doi=10.1.1.67.2417&rep=rep1&type=pdf; Jul. 27, 2003; 10 pgs.
(Continued)

*Primary Examiner* — Daniel F Hajnik

(57) ABSTRACT

Determining the occlusions or shadows for an area light within a scene is difficult, especially realistic shadowing in large and dynamic scenes. The disclosure provides an adaptive occlusion sampling process that uses voxel cone tracing to distribute the voxel tracing cones on the surface of area lights to obtain samples for shadowing in computer generated images or scenes. A method of adaptive occlusion sampling from a rectangular area light is disclosed that can be used to provide realistic shadowing in a computer generated scene. A process to compute a shadow of an area light within a scene is also disclosed herein that includes obtaining samples, employing voxel cone tracing, from a light surface of the area light based on sample points of a sampling grid created from sample patterns that are based on a determined number of cones.

20 Claims, 5 Drawing Sheets

Related U.S. Application Data continuation of application No. 16/482,377, filed as application No. PCT/US2019/023043 on Mar. 19, 2019, now Pat. No. 10,891,783.

(60) Provisional application No. 62/644,806, filed on Mar. 19, 2018.

(51) Int. Cl.
 *G06T 15/80* (2011.01)
 *G06T 19/20* (2011.01)

(52) U.S. Cl.
 CPC ............... *G06T 2215/12* (2013.01); *G06T 2219/2012* (2013.01)

(56) References Cited

OTHER PUBLICATIONS

Crassin, et al.; "Interactive Indirect Illumination Using Voxel Cone Tracing"; http://diglib.eg.org/ and http:/onlinelibrary.wiley.com; vol. 30(2011), No. 7; Dec. 9, 2011; 10 pgs.

Kok, et al.; "Adaptive Sampling of Area Light Sources in Ray Tracing Including Diffuse Interreflection"; Faculty of Technical Mathematics and Informatics, Delft University of Technology; http?//citeseerx.ist.psu.edu/viewdoc/download?doi=10.1.1.622.9876&rep=rep1&type=pdf; vol. 11, (1992), No. 3; May 1992; 10 pgs.

Michiels, et al.; "Interactive Relighting of Virtual Objects under Environment Lighting"; 10th International Conference on Computer Graphics Theory and Applications; GRAPP; 2015; 9 pgs.

Gaitatzes, et al. "Presampled Visibility for Ambient Occlusion"; Journal of WSCG; 2008; 11 pgs.

IMPROVING AREA LIGHT SHADOWS IN COMPUTER GENERATED SCENES

CROSS-REFERENCE TO RELATED APPLICATION

This application is a continuation of U.S. application Ser. No. 17/145,008, filed by Alexey Panteleev on Jan. 8, 2021, entitled "IMPROVING AREA LIGHT SHDOWS IN COMPUTER GENERATED SCENES," which is a continuation of U.S. application Ser. No. 16/482,377, filed Jul. 31, 2019, now U.S. Issued U.S. Pat. No. 10,891,783, issued Jan. 12, 2021, which is the National Stage of and claims the benefit of WO Application PCT/US2019/023043 filed on Mar. 19, 2019, published as WO 2019/183149 on Sep. 26, 2019, and which claims benefit of U.S. Provisional Application Ser. No. 62/644,806 filed on Mar. 19, 2018, all which are commonly assigned with this application and incorporated herein by reference in their entirety.

TECHNICAL FIELD

This application is directed, in general, to area lights in rendered scenes and, more specifically, to determining realistic shadowing from rectangular area lights in rendered scenes.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint and is analogous to taking a photograph of a real-world scene.

As the demand for computer graphics, and in particular for real-time computer graphics, has increased, computer systems with graphics processing systems adapted to accelerate the rendering process employing graphics processing units (GPUs) have become widespread. An application, often running on a central processing unit (CPU) performs high-level operations, such as determining the position, motion, and collision of objects in a given scene. From these high-level operations, the application, such as a video game, generates a set of rendering commands and data defining the desired rendered image or scene. For example, rendering commands and data can define scene geometry, lighting, shading, texturing, motion, and/or camera parameters for a scene. The graphics processing system then creates one or more rendered scenes from the set of rendering commands and data.

Many graphics processing systems enable complicated lighting and shading algorithms, among other things, to be implemented. To exploit these algorithms, applications can include one or more graphics processing system programs that implement the shading and lighting algorithms, which are executed by the graphics processing system in parallel with a main program executed by the CPU. For example, a scene defined by an application can include an area light. Determining the occlusions or shadows for the area light within a scene is difficult, especially realistic shadowing in large and dynamic scenes. A graphics processing system can use a lighting algorithm that employs ray tracing to sample the area light and determine shadows for a scene. Ray tracing, however, normally requires a great number of samples and typically produces noisy results with no continuity and a lack of smoothness.

SUMMARY

In one aspect, the disclosure provides a processor. In one example, the processor includes one or more processing units to perform one or more operations including: (1) generating, using the one or more processing units, one or more voxels using geometry information corresponding to one or more scenes and light information corresponding to the one or more scenes, (2) tracing, using the one or more processing units, one or more cones corresponding to an illuminant of the one or more scenes through the one or more voxels, wherein a number of the one or more cones traced is based on sampling a surface of the illuminant, (3) calculating, using the one or more processing units, one or more illumination values corresponding to the illuminant for one or more surface points in the one or more scenes based at least on the one or more traced cones.

In another aspect, the disclosure provides a system. In one example, the system includes one or more processing units to perform one or more operations relating to a computer generated scene having an illuminant and a geometry, the one or more operations including: (1) determining a number of cones for sampling the illuminant corresponding to a surface point on the geometry, (2) obtaining one or more samples from a light surface of the illuminant by tracing the cones, and (3) computing an average visibility for the surface point based on the one or more samples and a weight associated with at least one sample of the one or more samples as determined by sample patterns based on the number of cones.

In yet another aspect, the disclosure provides a method. In one example the method includes: (1) determining, for one or more computer-generated scenes including an illuminant and a geometry, a number of cones for sampling the illuminant corresponding to at least one surface point on geometry, (2) obtaining one or more samples from a light surface of the illuminant by tracing the number of cones, and (3) determining one or more illumination values from the illuminant on the at least one surface point based on the one or more samples and a weight associated with at least one sample of the one or more samples as determined by one or more sample patterns, wherein the sample patterns dynamically correspond to changes in a size of the illuminant.

BRIEF DESCRIPTION

Reference is now made to the following descriptions taken in conjunction with the accompanying drawings, in which.

Figure 4:
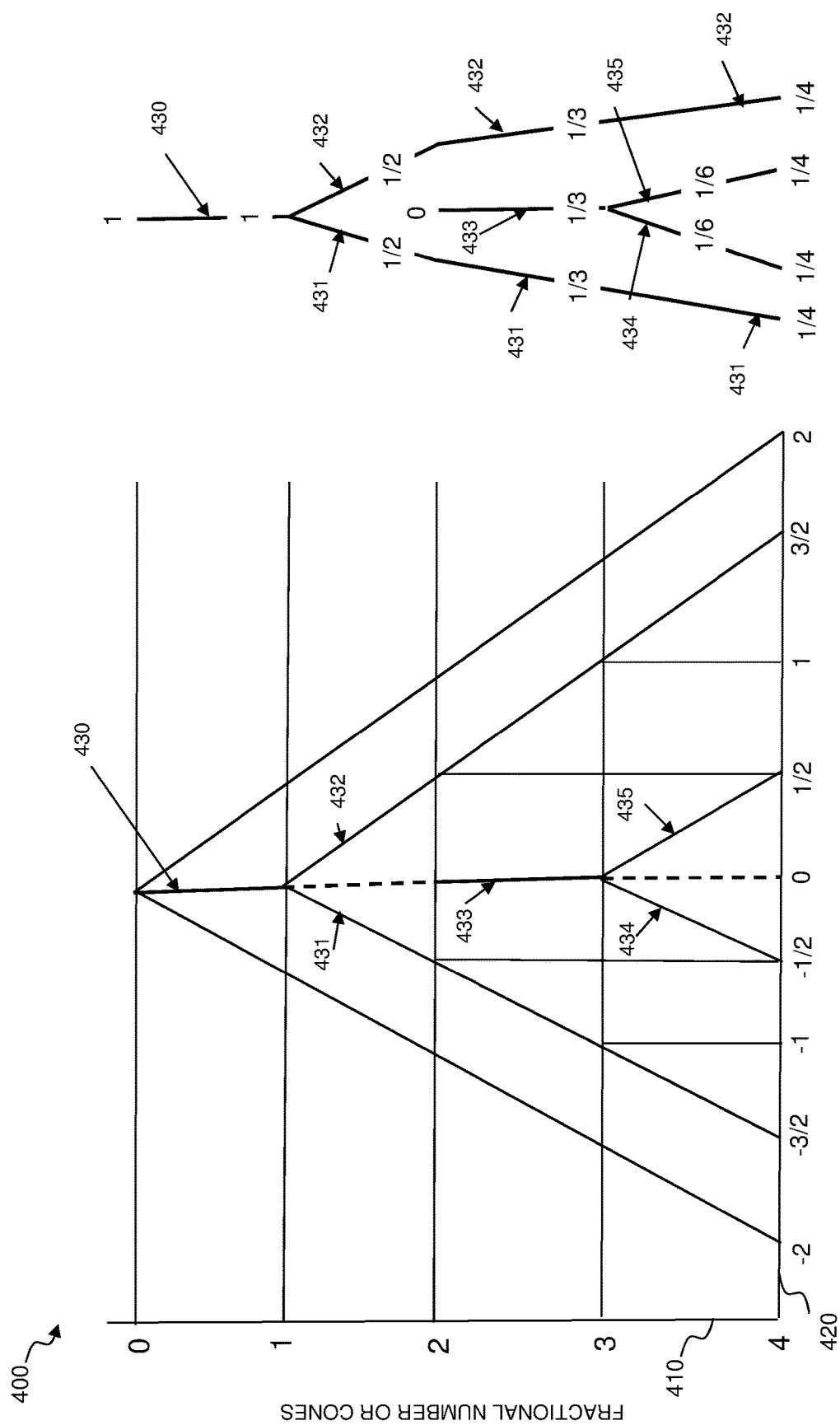
FIG. 4A illustrates a diagram of an example of a sample pattern for one dimension that is generated for a rectangular area light according to the principles of the disclosure.
Figure 5:
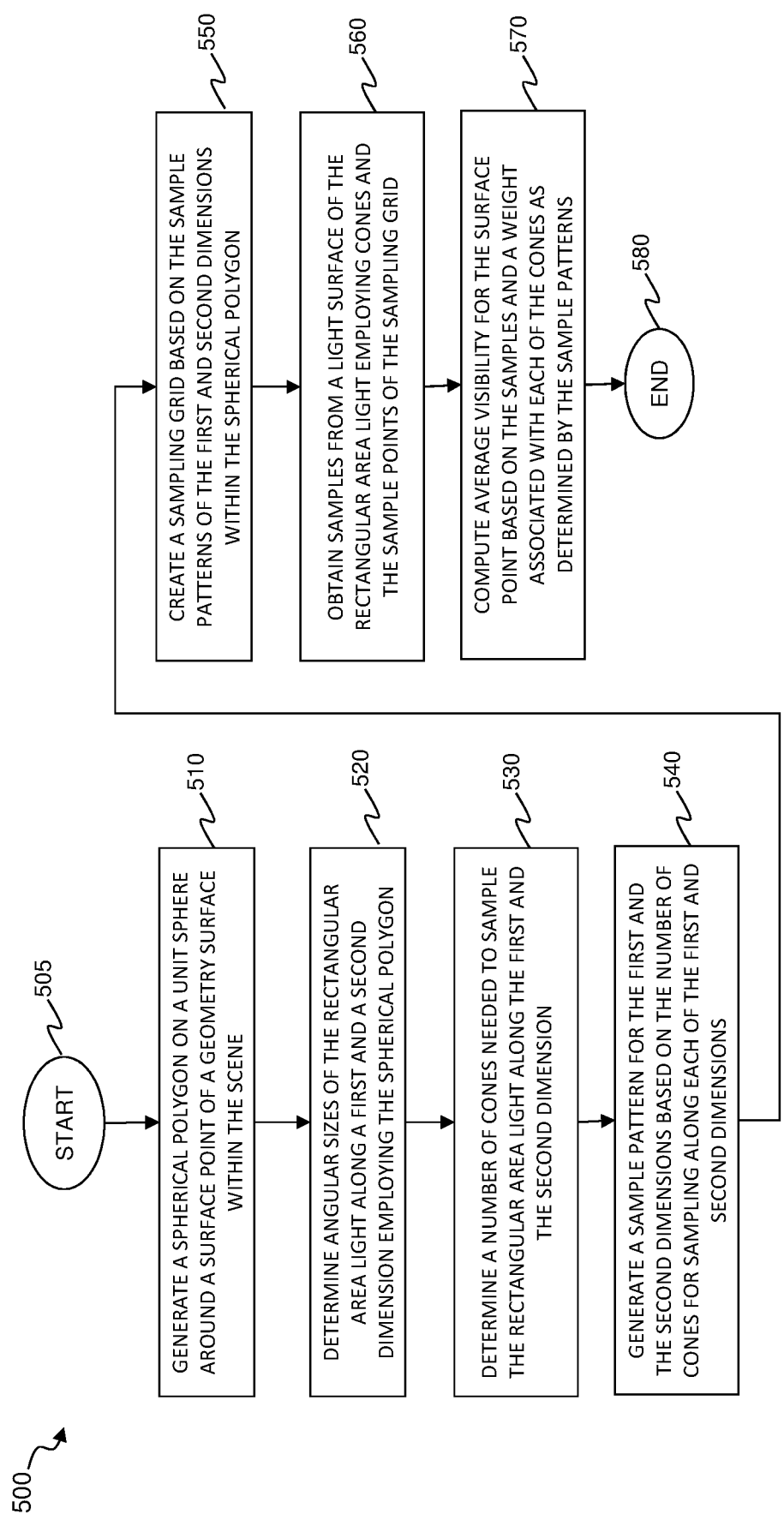

FIG. 4B that illustrates weights that are assigned to each of the samples of FIG. 4A when computing the average visibility for a surface point; and FIG. 5 illustrates a flow diagram of an example of a method of adaptive occlusion sampling from a rectangular area light to provide realistic shadowing in a computer generated scene carried out according to the principles of the disclosure.

DETAILED DESCRIPTION

Determining illumination of computer generated scenes is complicated due to the many paths between a light source in the scene and an observer's viewpoint that need to be calculated and rendered. For example, the observer can be a user playing a video game that includes a scene with a single light source and a table in a room having walls. For realistic lighting, the paths of the light to each point in the scene that is visible to the user need to be calculated. These light paths include all of the visible points on the table, walls of the room, and the floor of the room that receive the light directly from the light source. These light paths also include indirect paths that bounce off the different objects in the room before being observed by the user. These indirect paths would include the light path that starts at the light, bounces off a wall, bounces off the floor, and then continues to the user. The lighting calculations become more complex for scenes that include movement, multiple objects, multiple light sources, and when including shadows caused by the light sources and the multiple objects.

An area light is one type of light source that is used to light a scene and can cause a shadow. Using the above scene as an example with the light source being an area light, there can be an area on the floor in the room that is visible to the user, and the table is between the floor area and the area light. In other words, the table is casting a shadow on the floor area from the area light. The light visible to the user from each point in the floor area can vary due to the distance between the visible points to the area light, and the occlusion caused by the table.

As noted above, ray tracing can be used to determine shadows but would require many samples of the area light and produce noisy results. Instead of using ray tracing, voxel cone tracing (VCT) is another technique that can be used to determine occlusions for area lights. To use VCT, the area light is defined as four points in space or something equivalent, the surface of the area affected by the area light (e.g., floor area) is defined; and a voxel representation of the scene that encodes average opacity of the geometry (e.g., the table) in each voxel is provided. The voxel representation contains multiple resolutions and can be used for querying approximate occlusion along a given cone using voxel cone tracing (VCT), such as from the visible points of the floor area to the area light.

In order to provide high quality occlusion for the area light, in general multiple cones need to be traced from the affected surface (e.g., the floor area) towards different points on the surface of the area light. Multiple cones are required because the voxel tracing cones are always roughly square in shape, and area lights may be non-square. An area light is a plane, like a quad, that has a non-zero area and produces light. Additionally, when the area light is large or close to the surface, a single cone is impractically wide and does not provide enough resolution to the shadow.

When multiple cones are traced towards an area light, there is a problem in determining how to distribute the cones on the surface of the light to create realistic shadows. The following set of requirements are realized to be beneficial for realistic shadowing:

1. The number of cones traced towards an area light should be dynamic and depend on the light's shape, orientation, and distance to the surface. Generally, when a light covers a large portion of the hemisphere above the surface, there should be many cones; when it's small, there should be few cones, or even one cone.

2. The locations of sampling points on the light surface should change smoothly, otherwise there will be visible bands or flickering in the result. For example, if a large surface is lit by a relatively small light, there will be points on the surface that require different numbers of cones. The location on the surface where this number of cones changes will display an abrupt change in brightness unless the sampling pattern is smooth.

3. The sampling pattern overall should reflect the shape of the light and smoothly grow or shrink in either dimension if the light does the same. This is required because when there are few samples, the pattern of these samples defines the shape of the shadows, and the shadows should realistically react to the changes in light shape and orientation.

The disclosed techniques provide adaptive occlusion sampling that satisfies the above requirements by employing VCT and cleverly distributing the cones on the surface of area lights, such as rectangular area lights, to obtain samples for shadowing in computer generated images or scenes. Angular sizes of the rectangular area light along two dimensions are calculated using a spherical polygon and are used to determine the number of cones. The number of cones are used to determine sample patterns that are translated to within the spherical polygon, which is on a unit sphere around a surface point of a geometry in the scene. Sample points are determined from the sample patterns and are used to direct the cones from the surface point to samples on the light surface of the area light. Weights from the sample pattern are then used to determine an average visibility or shadow for the surface point.

Figure 1:
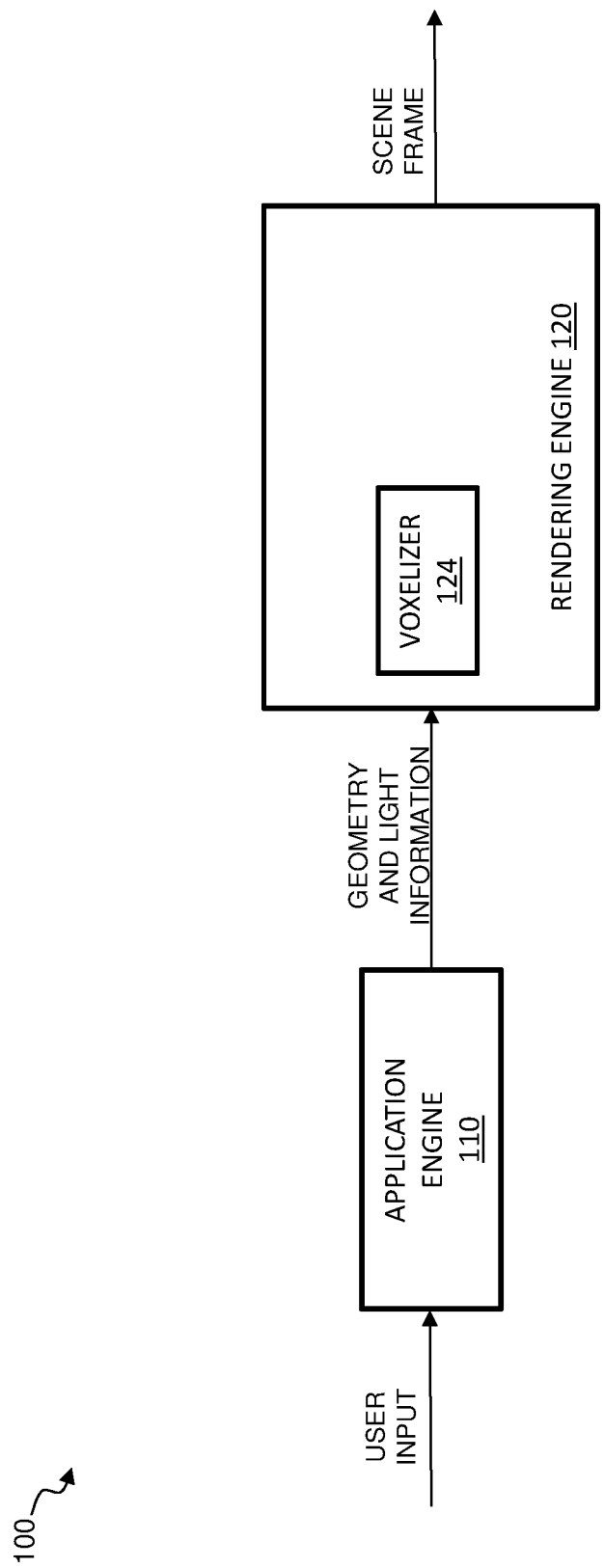
FIG. 1 illustrates a block diagram of an example of a computing system constructed according to the principles of the disclosure.

FIG. 1 illustrates a block diagram of an example of a computing system 100 constructed according to the principles of the disclosure. The computing system 100 is configured to render images from rendering commands. The rendered images provide scenes or frames of a scene that can be provided to a display for viewing. The computing system 100 includes an application engine 110 and a rendering engine 120. The computing system 100, or at least a portion thereof, can be implemented on a single server or on multiple servers of a cloud computing platform, data center, or other server environment. The computing system 100, or at least a portion thereof, can also be implemented on a user's computing device such as a desk top or lap top computer. In some applications the application engine 110 can be on a computing device that is communicatively coupled to the rendering engine 120 via a communications network. The communications network can be a conventional network, such as the internet, private network, or other type of network, that allows the connected computing device to communicate with the rendering engine 120.

The application engine 110 includes the operating instructions that correspond to algorithms employed to generate scenes, such as a game engine providing scenes from a video game. The application engine 110 can be implemented on a processor, such as a CPU. An application or program can include the operating instructions that direct the operation of the processor to generate a set of rendering commands and data defining the desired rendered scene. The rendering commands and data can define scene geometry, lighting, shading, texturing, motion, and/or camera parameters for a scene. The application engine 110 can use inputs from a user to generate the rendering commands and data. The inputs can be from a client device, such as a game device.

The rendering engine 120 receives the rendering commands from the application engine 110 and creates one or more rendered scenes from the set of rendering commands and data. The rendering engine 110 includes operating instructions that correspond to algorithms employed to render the scenes. As noted above, in some applications the rendering engine 120 can be a cloud-based and server-based renderer. The rendering engine 120 includes a voxelizer 124 and can also include additional components typically included in a renderer.

The voxelizer 124 is configured to use VCT to determine occlusions and solve shadowing from an area light within a scene. The voxelizer 124 uses geometry and light information from the application engine 110 to convert geometry of the scene into voxels (i.e., voxelation) to create a voxel representation of the scene, and to compute the illumination from the light or affect of the lights on the geometry. The voxelizer 124 traces cones through the voxels of the voxel representation to determine visibility between two points and provide surface texture that contains information about lighting on the surface of a geometry that is visible in the scene. The rendering engine 120 employs the occlusion and surface texture information from the voxelizer 124 to render scenes with realistic shadowing. The voxelizer 124 can include operating instructions that correspond to algorithms represented by a set of instructions of a computer program product that, when executed by one or more processor, causes the executing processor to provide the surface texture that includes the lighting information for shadowing. The algorithms can operate according to FIG. 3, FIG. 4A, and FIG. 5 as disclosed and discussed herein. In one application, the voxelizer 124 is an implementation of a global illumination algorithm that employs VCT and includes the functionality disclosed herein. Voxel Global Illumination (VXGI) that is available from Nvidia Corporation of Santa Clara, Calif., is an example of such a global illumination algorithm that can be used in game engines to render realistic area lights with occlusion.

Figure 2:
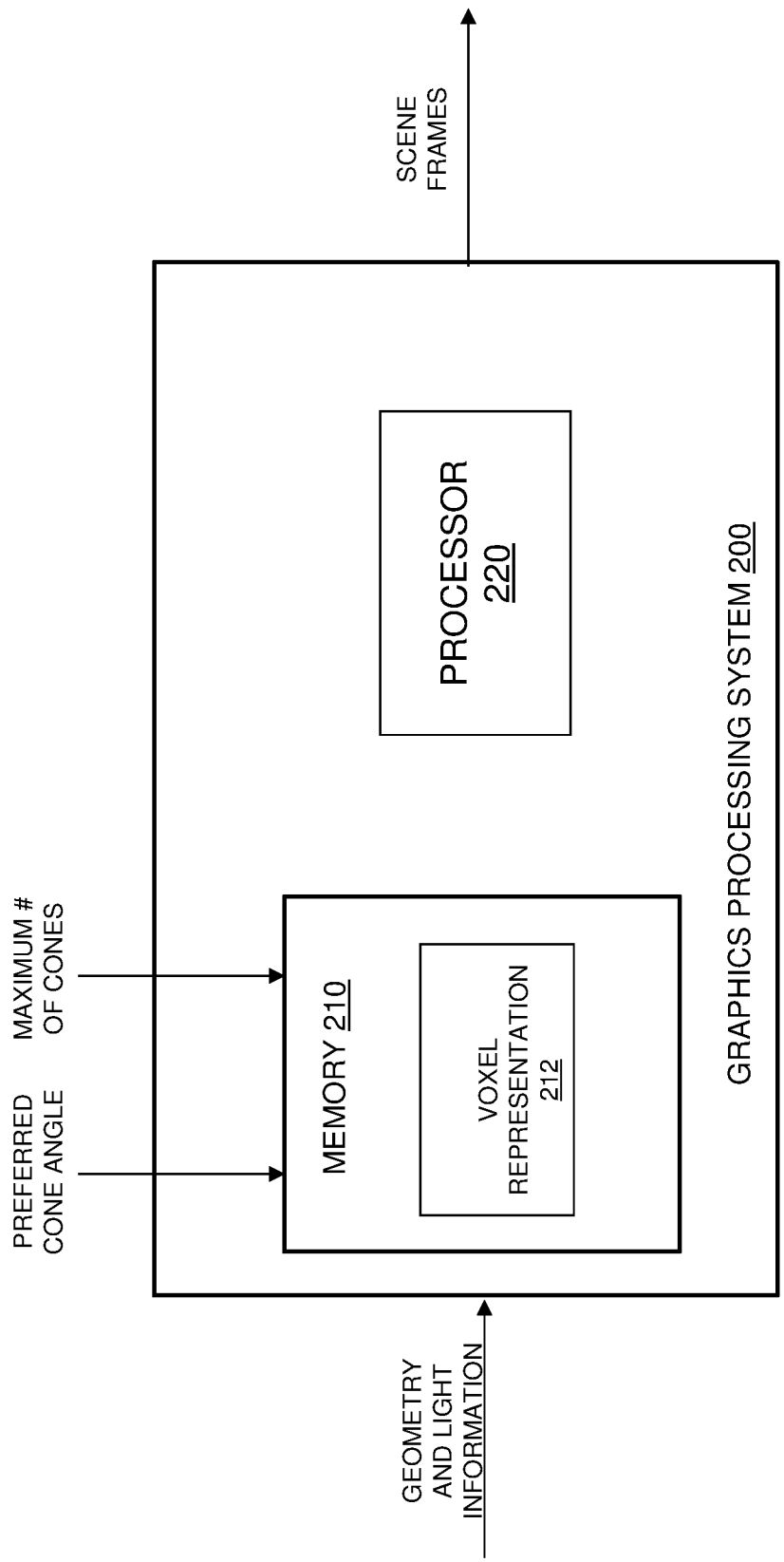
FIG. 2 illustrates a block diagram of an example of a graphics processing system constructed according to the principles of the disclosure.

FIG. 2 illustrates a block diagram of an example of a graphics processing system 200 constructed according to the principles of the disclosure. The graphics processing system 200 renders scenes employing VCT for determining shadows for area lights. The graphics processing system 200 includes a memory 210 and a processor 220. It is understood that although not illustrated, the graphics processing system 210 may also include other conventional components typically used with a graphics processing system. For example, the graphics processing system 200 may include one or more CPUs and one or more co-processors, which may take the form of one or more GPUs. The graphics processing system 200 can be a rendering engine, such as the rendering engine 120.

The memory 210 is configured to store voxel representations of scenes, represented by voxel representation 212. In examples discloses herein, the voxel representation 212 is of a scene that includes an area light, such as a rectangular area light, and at least one geometry. The memory 214 may be any one or more of data storage devices, such as a read-only memory (ROM), a volatile random-access memory (RAM) and solid-state or hard drive storage unit. The memory 210 can also store operating instructions for directing the operation of the processor 220.

The processor 220 is configured to perform adaptive occlusion sampling from an area light in a scene to provide realistic shadowing from the area light. The area light can be a rectangular area light. In various examples, the processor 220 is one or more GPUs. The processor 220 can determine a number of cones for sampling the area light corresponding to a surface point on the geometry. The processor 220 can employ a preferred cone angle and a maximum number of cones for determining the number of cones. An algorithm directing the operation of the processor 220 can receive the preferred cone angle and the maximum number of cones as inputs. The processor 220 can further employ the cones to obtain samples from a surface of the area light based on sample points of a sampling grid created from sample patterns that are based on the number of cones. The processor 220 can compute average visibility for the surface point based on the samples and a weight associated with each of the cones as determined by the sample patterns. The processor 220 can operate according to operating instructions that correspond to algorithms represented by FIG. 3, FIG. 4A, FIG. 4B, and FIG. 5.

Figure 3:
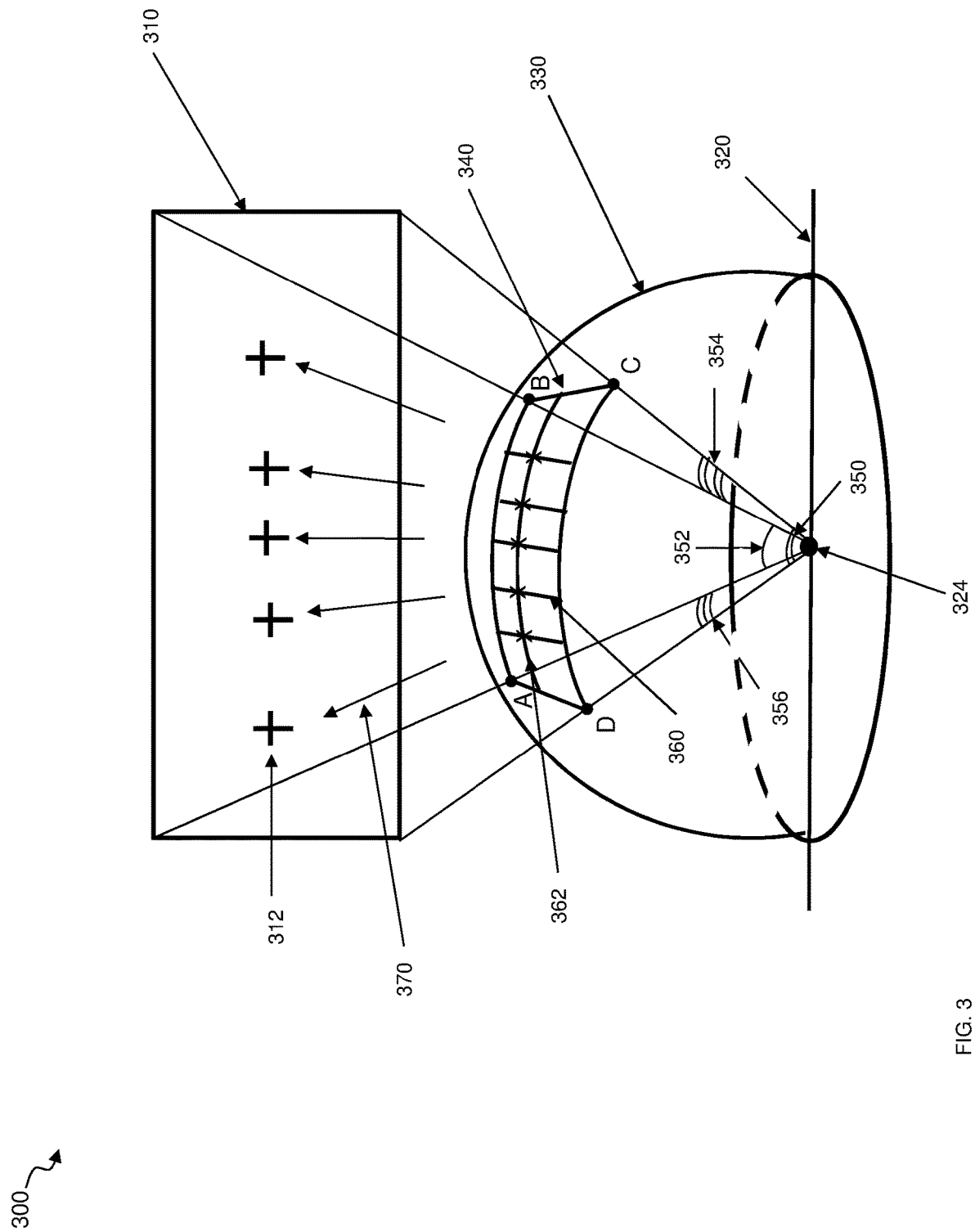
FIG. 3 illustrates a diagram representing steps of an example algorithm that is used to determine shadows from a rectangular area light within a scene carried out according to the principles of the disclosure.

FIG. 3 illustrates a diagram 300 representing steps of an example algorithm that is used to determine shadows from a rectangular area light 310 within a scene carried out according to the principles of the disclosure. A shadow of the rectangular area light 310 is cast on a surface 320 within the scene that includes a surface point 324. A unit sphere 330 is positioned around the surface point 324. The first step of the sampling algorithm is to project the rectangular area light onto the unit sphere 330 around the surface point 324. This produces a spherical polygon 340 (i.e., a rectangle in this instance) defined by four points in its corners, points A, B, C, and D.

The angular size of the rectangular area light 310 is computed in two dimensions. For example, the rectangular area light 310 is built from the four points A, B, C, D, in a clockwise direction. Each of the points A, B, C, and D is also a unit length vector since they are each projected onto the unit sphere 330 and represent the angular area light projected through the unit sphere 330.

Angular size in one dimension, a first dimension, would be the maximum of angles AB and CD and the angular size in the other dimension, a second dimension, is the maximum of angles AD and BC. The first dimension can be referred to as a major dimension since it corresponds to the longer axis of the rectangular area light 310 and the second dimension corresponds to the shorter axis of the rectangular area light 310.

The major angular sizes and the minor angular sizes are used to determine the number of cones needed to sample the rectangular area light 310 in each dimension. The major angular sizes are denoted by element numbers 350, 352, in FIG. 3 and the minor angular sizes are denoted by element numbers 354, 356, in FIG. 3. The algorithm determines the number of cones by dividing the angular sizes by a preferred cone angle. The preferred cone angle is received as an input by the algorithm. The preferred cone angle can be, for example, ten degrees.

Since the result of the angle division can be a fractional number, and tracing a fraction of a cone is not feasible, the algorithm rounds the division numbers up to determine the actual number of cones. The fractional numbers can be useful later.

The resulting integer numbers of cones in both dimensions are multiplied to determine the total number of cones required for the surface point 324. If the total number of cones is greater than a preset maximum, the preferred cone angle is increased until the total number of cones fits within the limit. The preset maximum is received as an input by the algorithm.

With the number of cones for both dimensions now known, the algorithm generates two sample patterns, one per each dimension. The resulting overall sampling pattern is a Cartesian product of the two patterns that creates a sampling grid that is translated to be within the spherical polygon 340, sampling grid 360. Each sample point 362 (shown as an "x") in the sampling grid 360 has 2D coordinates inside the spherical polygon 340 of the rectangular area light 310 and a weight. The coordinates can be translated to points on the spherical polygon 340 with corresponding directions using bi-spherical interpolation (i.e., "Bi-slerp)" between the four points A, B, C, D, defining the rectangular area light 310. Bi-slerp is defined similar to bilerp, i.e., slerp(slerp(A, B, x), slerp(D, C, x), y), wherein the order of slerp's in the expression does matter.

Diagram 300 further includes cones 370 (represented by arrows in FIG. 3) through the sample points 362 to samples 312 on a surface of the rectangular area light 310. The samples 312 (shown as crosses in FIG. 3) are determined by the cones 370 that extend from the surface point 324 through the sample points 362 to the various sample points 312 of the rectangular area light 310. FIG. 4A provides an example of a sample pattern that can be used to determine the sampling grid 360 and sample points 362.

FIG. 4A illustrates a diagram of an example of a sample pattern 400 for one dimension that is generated for a rectangular area light according to the principles of the disclosure. The specific sampling patterns along each dimension are designed to satisfy the smoothness and shape requirements. The sample pattern 400 provides a continuous pattern that shows the dependence of the distribution of the positions of the samples from the angular size of the light in one dimension. The sample pattern 400 is presented along a vertical axis 410 and a horizontal axis 420, where the vertical axis 410 represents the fractional number of cones, which is proportional to the angular size of the rectangular area light, and the horizontal axis 420 represents the location of samples along a particular dimension. The horizontal lines parallel to the horizontal axis 420 represent the division between the number of cones, i.e., the integer number of cones. In this example, four cone divisions are illustrated. Corresponding to FIG. 4A is FIG. 4B that illustrates the weights that are assigned to each of the samples when computing the average visibility for a surface point.

At the top of the vertical axis 410, the light is small and/or is far away from a surface. As such, the light has a small angular size. At the bottom of the vertical axis 410, which is along the horizontal axis 420, the light is large and/or is close to the surface. Accordingly, the light has a large angular size.

Starting at zero size at the top of the vertical axis 410, there is one sample 430 of a rectangular area light in the center. When the angular size becomes larger resulting in more than one cone, that one sample 430 splits into two samples, 431 and 432, with equal weight, originally located in the same place but spreading apart as the angular size increases. When the angular size continues to grow resulting in more than two cones, an additional sample 433 with zero weight is introduced in the middle. As the angular size increases, the two original samples 431, 432, spread further apart, and the middle sample 433 gains weight. Further down, the middle sample splits into two samples 434, 435. The number of samples smoothly transitions with the angular size as the angular size increases and decreases.

Consider a first dimension for a rectangular area light having an angular size of forty degrees and wherein the preferred cone angle is ten degrees. Then the number of cones needed for sampling would be four as represented on the horizontal axis 420. If the angular size of the light is thirty five degrees, then the samples would be between horizontal lines corresponding to three cones and four cones. Continuing below the horizontal axis 420 and another center sample of weight zero would be added resulting in five samples. Accordingly, as the size of the light changes, the sampling pattern will also react accordingly and move the samples. The shadows will then be smoothly changing as the light changes.

Overall, there are always some samples "attached" to the sides or corners of the rectangular area light, and they move as the light grows or shrinks, and the shadow responds. When a new sample is introduced, the sample either has zero weight or appears from splitting an existing sample, so there is no sharp change in the results. The s ample pattern 400 smoothly reacts to changes in quality settings, i.e., a light can be sampled with a larger number of narrow cones, or with a lower number of wide cones, with a continuous range of options between the two. Square lights visible at oblique angles are sampled more in the dimension where they are still long, again with a continuous transition.

Regular sampling patterns, such as sample pattern 400, may produce aliasing. In order to eliminate this aliasing, the entire sampling pattern 400 can be slightly rotated by adding an offset to the bi-slerp interpolation factors, with the offset being different per-pixel or per-frame. In some examples, the amount of offset or jitter applied to the sample positions is smaller than the distance between the two closest samples. The distance between the samples can then be used as a measurement to stop rotating or used to compute how much jitter or how much to rotate. The amount of jitter can be slightly different on every frame allowing filtering instead of aliasing.

FIG. 5 illustrates a flow diagram of an example of a method 500 of adaptive occlusion sampling from a rectangular area light to provide realistic shadowing in a computer generated scene carried out according to the principles of the disclosure. The method 500 can be carried out by a voxelizer, such as the voxelizer 124 of FIG. 1, and/or a graphics processing system, such as the graphics processing system 200 of FIG. 2. The method 500 is for a single surface point and corresponds to FIG. 3, FIG. 4A, and FIG. 4B. For multiple surface points, the method 500 will be repeated. The method 500 begins in a step 505.

In a step 510, a spherical polygon is generated on a unit sphere around a surface point of a geometry (surface) within the scene. The spherical polygon is generated based on the rectangular area light. The spherical polygon can be generated by projecting the rectangular area light onto the unit sphere. As illustrated in FIG. 3, the spherical polygon has a shape corresponding to the rectangular area light.

In a step 520, angular sizes of the rectangular area light are determined along a first and a second dimension employing the spherical polygon. The angular size along the first dimension is the maximum angle between points along the first dimension defining the spherical polygon and the angular size along the second dimension is the maximum angle between points along the second dimension defining the spherical polygon.

A number of cones needed to sample the rectangular area light along the first and the second dimension are determined in a step 530 employing the angular sizes. In one example, the number of cones are calculated by dividing the angular sizes of the first and the second dimensions by a preferred cone angle, rounding-up results of the dividing to integer numbers when the dividing results in a fractional number, and then multiplying the integer numbers for each of the dimensions to obtain a total number of cones.

In some examples, the total number of cones can be greater than a preset maximum. Accordingly, the preferred cone angle is increased and the number of cones for the first and the second dimensions are recalculated employing the increased preferred cone angle. The preferred cone angle and the present maximum can be received as inputs, such as from a programmer or developer. The preferred cone angle and preset maximum can be based on historical analysis or experimental data that is input to the algorithm based on performance quality tradeoffs.

In a step 540, a sample pattern for the first and the second dimensions is generated based on the number of cones for sampling along each of the first and second dimensions. The sample pattern along each of the dimensions can vary based on the angular size for each dimension. Each of the sample patterns is organized along a vertical and a horizontal axis, wherein the vertical axis represents a fractional number of cones that is proportional to the angular size along the first or second dimension, and the horizontal axis represents the samples along the first or second dimension.

In a step 550, a sampling grid based on the sample patterns of the first and second dimensions is created within the spherical polygon. The sampling grid includes sample points that correspond to the intersection of the sample patterns from each of the first and second dimension. The sampling grid is translated to within the spherical polygon employing bi-spherical interpolation, wherein each sample point of the sampling grid has two dimensional coordinates within the spherical polygon. As noted above, bi-spherical interpolation, or bi-slerp, is defined similar to bilerp. For the spherical rectangle such as spherical polygon 340 of FIG. 3, the bi-slerp is slerp(slerp(A, B, x), slerp(D, C, x), y), wherein A, B, C, and D represent the four corners and x and y correspond to the Cartesian coordinates of the grid.

Samples from a light surface of the rectangular area light are obtained in a step 560 employing cones and the sample points of the sampling grid. The samples are obtained by tracing cones from the surface point through the sample points of the sampling grid to samples on the surface of the rectangular area light. The cones are traced through a voxel representation of the scene. The total number of the cones is a product of the number of cones for sampling along each of the first and second dimensions. Before obtaining the samples, the sample patterns with respect to the spherical polygon can be rotated.

In a step 570, average visibility for the surface point based on the samples and a weight associated with each of the cones as determined by the sample patterns is computed. The computed average visibility from the samples can then be used for rendering of the surface point. The method 500 ends in a step 580.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

The above-described apparatuses, systems or methods or at least a portion thereof may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein or features thereof may further relate to computer storage products with a non-transitory computer-readable medium that has program code thereon for performing various computer-implemented operations that embody at least part of the apparatuses, the systems, or to carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A processor, comprising:
one or more processing units to perform one or more operations including:
generating, using the one or more processing units, one or more voxels using geometry information corresponding to one or more scenes and light information corresponding to the one or more scenes,
tracing, using the one or more processing units, one or more cones corresponding to an illuminant of the one or more scenes through the one or more voxels, wherein a number of the one or more cones traced is based on sampling a surface of the illuminant, and
calculating, using the one or more processing units, one or more illumination values corresponding to the illuminant for one or more surface points in the one or more scenes based at least on the one or more traced cones.

2. The processor as recited in claim 1, wherein calculating the one or more illumination values includes obtaining one or more sample points from a surface in the scene corresponding to the one or more surface points.

3. The processor as recited in claim 2, wherein the one or more sample points are obtained from a sampling grid created using one or more sample patterns.

4. The processor as recited in claim 3, wherein the one or more sample patterns correspond to a shape of the illuminant.

5. The processor as recited in claim 3, wherein the one or more sample patterns dynamically adjust according to a change in a size of the illuminant.

6. The processor as recited in claim 1, wherein the number of cones traced corresponds to at least one of: a shape of the illuminant, an orientation of the illuminant in the one or more scenes, or a distance between the illuminant and the surface in the one or more scenes.

7. The processor as recited in claim 1, wherein the illuminant is an area light.

8. The processor as recited in claim 1, wherein the one or more scenes correspond to a game application, the geometry information and the lighting information being comprised in rendering commands generated by the game application.

9. The processor as recited in claim 1, wherein at least one of the one or more processing units is comprised in a cloud-computing platform.

10. The processor as recited in claim 1, wherein at least one of the one or more processing units comprises:
   a central processing unit (CPU);
   a graphics processing unit (GPU);
   a hardware accelerator;
   a field-programmable gate array (FPGA); or
   an application-specific integrated circuit (ASIC).

11. The processor as recited in claim 1, wherein the calculating includes calculating the one or more illumination values from the illuminant for multiple surface points in the scene.

12. A system, comprising:
   one or more processing units to perform one or more operations relating to a computer generated scene having an illuminant and a geometry, the one or more operations including:
      determining a number of cones for sampling the illuminant corresponding to a surface point on the geometry,
      obtaining one or more samples from a light surface of the illuminant by tracing the cones, and
      computing an average visibility for the surface point based on the one or more samples and a weight associated with at least one sample of the one or more samples as determined by sample patterns based on the number of cones.

13. The system as recited in claim 12, wherein the weight associated with the at least one sample of the one or more samples is based on one or more sample points of a sampling grid created from the sample patterns.

14. The system as recited in claim 12, wherein the sample patterns dynamically adjust according to a change in a size of the illuminant.

15. The system as recited in claim 12, wherein the number of cones corresponds to at least one of: a shape of the illuminant, an orientation of the illuminant in the one or more scenes, or a distance between the illuminant and the surface in the one or more scenes.

16. The system as recited in claim 12, wherein the illuminant is a rectangular area light.

17. The system as recited in claim 12, wherein the system comprises a cloud-computing platform.

18. The system as recited in claim 12, wherein at least one of the one or more processing units comprises:
   a central processing unit (CPU);
   a graphics processing unit (GPU);
   a hardware accelerator;
   a field-programmable gate array (FPGA); or
   an application-specific integrated circuit (ASIC).

19. A method, comprising:
   determining, for one or more computer-generated scenes including an illuminant and a geometry, a number of cones for sampling the illuminant corresponding to at least one surface point on the geometry,
   obtaining one or more samples from a light surface of the illuminant by tracing the number of cones, and
   determining one or more illumination values from the illuminant on the at least one surface point based on the one or more samples and a weight associated with at least one sample of the one or more samples as determined by one or more sample patterns, wherein the sample patterns dynamically correspond to changes in a size of the illuminant.

20. The method as recited in claim 19, wherein the determining the one or more illumination values includes computing average visibility for the at least one surface point based on the one or more samples and the weight associated with the at least one sample of the number of samples.

* * * * *